Nov. 13, 1951    M. A. CHAVANNES ET AL    2,575,046
PROCESS FOR PRODUCING ORNAMENTAL PLASTIC FILMS
Filed Dec. 19, 1945    3 Sheets-Sheet 1

INVENTORS
MARC A. CHAVANNES
GEORGE T. TRAUT
BY
ATTORNEY

Nov. 13, 1951 — M. A. CHAVANNES ET AL — 2,575,046
PROCESS FOR PRODUCING ORNAMENTAL PLASTIC FILMS
Filed Dec. 19, 1945

INVENTORS
MARC A. CHAVANNES
GEORGE T. TRAUT
BY
ATTORNEY

Patented Nov. 13, 1951

2,575,046

UNITED STATES PATENT OFFICE 2,575,046

PROCESS FOR PRODUCING ORNAMENTAL PLASTIC FILMS

Marc A. Chavannes, Lisbon, and George T. Traut, Danielson, Conn., assignors, by direct and mesne assignments, to Chavannes Industrial Synthetics, Inc., New York, N. Y., a corporation of Delaware Application December 19, 1945, Serial No. 635,982

35 Claims. (Cl. 18—57)

This invention relates to a method of producing films of resinous materials, from suitable dispersions of the same.

It has particular reference to the control of the smoothness of the surface of such films, it being possible by the teachings of the present invention to produce a film which is undulated, or one which is extremely smooth, whichever is desired. It also relates to the control of the transparency of such films.

The invention is especially applicable for the production of smooth or undulated, self-supporting plastic films made from a dispersion comprising a vinyl resin and a dispersant. The undulated film produced may vary widely in form, having fine or coarse undulations, a frosted apperance, or other ornamental or useful effects in intaglio and relief. The smooth film produced by the present invention is considerably smoother and more transparent than film usually produced from dispersions of vinyl resins. It is substantially as smooth and transparent as film produced from solution, by more expensive methods.

One object of the invention is to produce a glossy, self-supporting, plastic film at least part of one surface of which is undulated, said undulated portion exhibiting a scintillating effect, the degree of scintillation being controllable by the manufacturing process, as described hereinafter. The term "to scintillate" is used herein to mean to "sparkle" when exposed to light, somewhat as diamonds do. If desired, the film can be produced with both surfaces undulated.

Another object is to produce a self-supporting plastic film including an undulated area which constitutes only part of one surface, the shape of said undulated area conforming to any desired pattern. A feature of such a film is that the undulated regions may be considerably thicker than the smooth regions.

A feature of one embodiment of the invention is that a film may be produced one surface of which is undulated, the surface opposite being smooth. A further feature is that in a colored film with one undulated and one smooth surface, scintillation is greatly enhanced by so forming the film that the dye is somewhat more concentrated in the region of the undulated surface, the major portion of the film toward the smooth surface being more nearly colorless.

A further object of the invention is to produce a self-supporting plastic film one surface of which is undulated, the valleys of such undulations being so pronounced that the film is perforated at a multiplicity of points, hence being made porous.

A further important object of the invention is to produce a film undulated at least in part, which is fluorescent or phosphorescent.

A further object of the invention is to produce an ornamental sheet or web comprising an undulated film applied to a transparent or light-reflecting supporting sheet or web, which supporting member may be flexible or rigid.

Further objects, features and advantages will appear from the more detailed description set forth below by way of illustration, which will now be given in conjunction with the accompanying drawings, in which.

Figure 1:
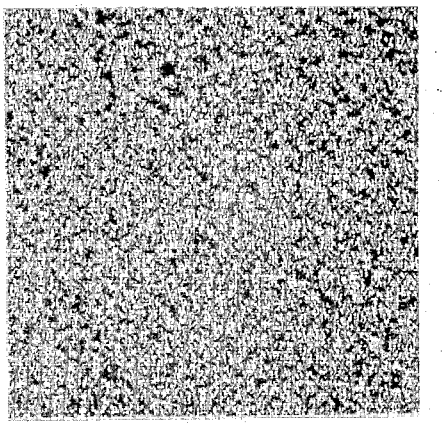
Figs. 1 and 2 are photolithographic plan views of the surfaces of different undulated, self-supporting plastic films produced by the process of the present invention.
Figure 2:
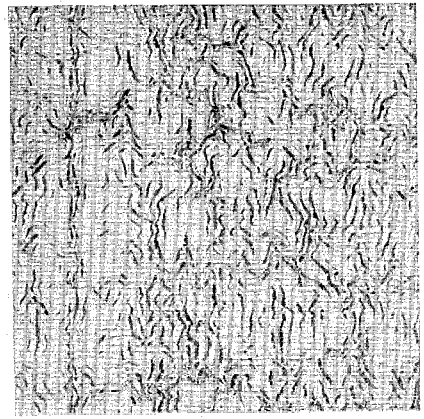
Figure 3:
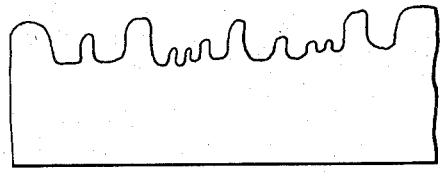
Fig. 3 is a magnified cross sectional view of a film such as that shown in Fig. 1 or that shown in Fig. 2.

The undulations of the film illustrated in Fig. 1 are finer than those of the film shown in Fig. 2, and the film of Fig. 1 has had metallic flakes added thereto in a manner to be described later. A process for producing a resinous, undulated, scintillating film such as is illustrated in Figs. 2 and 3 will now be described in connection with apparatus shown in Fig. 4. The same general steps of the process can also be used to produce the aforementioned smooth, transparent, glossy film. The factors which control the type of film obtained will be described at a later point.

Let it be assumed that in making the film a copolymer of vinyl acetate and vinyl chloride is to be included as a resin. The product of Carbide and Carbon Chemical Corporation known by the trade name VYNV-1 is a satisfactory copolymer of vinyl acetate-chloride. It is of relatively high molecular weight, which is desirable. The resin may have an average molecular weight of approximately 100,000 units, preferably greater. The size of the finest particles in the present example may be of the order of 1/300 micron and the coarsest ones of the order of 1/10 micron.

An organosol or dispersion is first made by milling together, in a ball or pebble mill, these finely divided particles of resin along with a dispersant and a diluent. The term "organosol" is used in the present application to mean a sol in an organic liquid, and more particularly to mean a suspension, as distinguished from a true solution, of a film-forming material.

The term "dispersant" will be used considerably in the present discussion, with the following meaning:

The organosol is, as indicated, made up of a resin and various liquids, which have been milled together. A part of these liquids has a great affinity for the surface of the resin molecules or chains, being adsorbed on the surface of these resin chains and having a plasticizing effect at some time during the film-forming process. This part of the liquids is, by definition, the dispersant. The term thus includes plasticizers and bodies performing a similar function during the process. In the present example the dispersant may be considered to comprise a plasticizer, such as dioctyl phthalate, and a high boiling diluent, such as xylol. Instead of xylol there may be used a treated petroleum solvent comprising approximately 80% aromatics and 20% aliphatics, having a boiling range approximately as follows: 5%, 138° C.; 95%, 168° C. An example of such a solvent is a solvent presently sold by Standard Oil Company of New Jersey under the trade-mark "Solvesso."

In addition, there may be used in the organosol a lower boiling diluent such as a petroleum distillate having an aromatic content of approximately 9½% and having a boiling range approximately as follows: 5%, 123° C.; 95%, 165° C. An example of such a diluent is the solvent presently sold by the Anderson-Pritchard Oil Company under the trade mark "Apco" thinner. One successful formula for the organosol is as follows, where the percentages by weight of the various ingredients are given:

| | Per cent |
|---|---|
| Vinyl acetate-chloride copolymer (VYNV-1) | 48.4 |
| Dioctyl phthalate | 24.1 |
| Apco | 18.4 |
| Xylol or "Solvesso" | 9.1 |

Various other ingredients and proportions can be used satisfactorily. It is desirable that the ratio by weight of plasticizer to resin be greater than 0.15 to 1 and preferably greater than 0.25 to 1. Also, it should preferably be less than 1.1 to 1.0. It has been found desirable to use a plasticizer which has a fairly strong solvating action on the resin.

The time of grinding and the optimum temperature of the mixture will be determined by the formula for the organosol mixture. As an example, grinding for about 24 hours may be necessary, and for some mixtures the temperature should be about 100° F.

The organosol or dispersion is then removed from the mill and is applied as a coating to a carrier. The carrier may be similar to that described in pending applications Serial Numbers 458,898 and 503,365, filed on September 18, 1942, and September 22, 1943, respectively, by Marc A. Chavannes, applicant the former now abandoned and the latter now U. S. Patent No. 2,443,443. As disclosed in said prior applications, the carrier is preferably formed of strong, relatively heavy paper having applied to one, or both, of its surfaces a firmly adhering coating of a base material, such as polyvinyl alcohol, casein or the like, capable of providing a smooth outer surface on the carrier to which the film-forming coating will but lightly adhere. The paper or other supporting material may be in the form of a web, that is, being supplied from one roll and wound up on another roll after being used. Alternatively, it could be in the form of a continuous belt, or in sheet form. For convenience, it will be assumed to be in the form of a web. It will be understood, by reference to the prior applications above-mentioned, that the character of the base coating preferably applied to the carrier web will vary with the character of the film to be produced. For instance, a plasticized casein coating has been found well suited for the purpose of a carrier on which a Vinylite film, i. e., a copolymer of vinyl acetate and vinyl chloride, is to be formed. Such a base coating may also be used for the production of films of other types of synthetic or natural resins. A polyvinyl alcohol coating may also be used in the formation of most resinous films but such coating should preferably be heavily filled. In the production of films from other plastic substances, the base coating on the surface of the web should be such as not to react with any solvent used and not to be affected by the temperature and other conditions employed in the process. Moreover, it should be flexible, so as not to crack in normal handling or in its passage through the coater and dryer, and such that the final film may be readily stripped from it. Various thermosetting resins provide suitable base coatings for a large number of different types of films. The web itself, in lieu of being formed of paper, may be formed of other relatively inexpensive, flexible material capable of withstanding the strains and conditions to which it is subjected in the conduct of the process. It may, for example, be formed of a cellulose derivative or of asbestos paper, or metal foil, or of fibre glass, or the like. Such materials are, in the main, more durable than paper when subjected to the high temperature conditions met with in the dryer.

If it is desired to produce a highly transparent film or a film with marked scintillating properties, it is important that the lower or back surface of the film be extremely smooth. One method discovered for producing such a smooth lower surface is to coat a carrier web with a coating comprising base material as mentioned above, with the added provision that said coating be of such thickness that any irregularities in the web material do not protrude through the upper surface of this coating of base material, and do not affect the smoothness of the surface. The surface tension of this base material, along with the effect of gravity, produces a very flat smooth surface which, when dried, provides a satisfactory carrier. A resinous film formed by coating an organosol upon such a surface will be quite smooth on its lower surface, and its transparency will be considerably enhanced.

An example of a particularly satisfactory base material for this use is three parts of alkyd to one part of melamine, where the alkyd may be the product of American Cyanamide Co. known as "Resil."

After preparation of the carrier, the organosol is coated on same, using a suitable means for applying a layer of a dispersion to a moving carrier. Such coating means are illustrated very generally in Fig. 4, which is a schematic representation of manufacturing apparatus for producing the desired film. It will be noted that the coating apparatus of Fig. 4 is of the reverse coater type, but the process and apparatus are not restricted to this type of coater.

Figure 4:
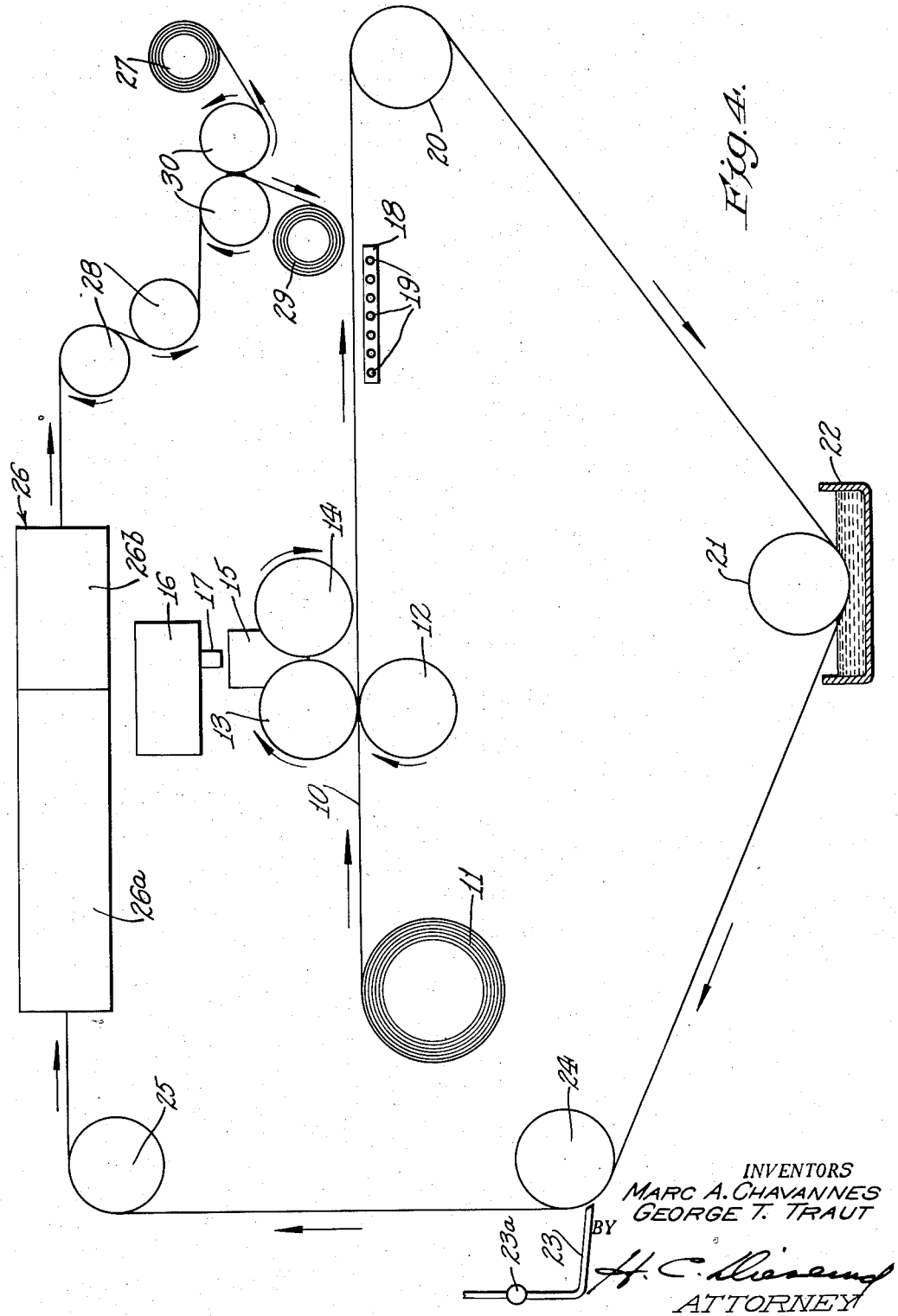
Fig. 4 is a schematic representation of manufacturing apparatus for producing such film.

Referring to Fig. 4, let it be assumed that the paper carrier web used in the process has already been provided with its permanent, smooth coating of base material, as previously mentioned. This may have been accomplished by a prior operation or series of operations using approximately the same equipment as that shown in Fig. 4.

As shown, the permanently coated carrier 10 may be carried by a reel 11. It is drawn from this reel by a rubber-coated roller 12 pressed against the lower surface of the carrier. This roller rotates in a clockwise direction in the illustrated arrangement so as to urge the carrier toward the right in Fig. 4. Cooperating with this roller is a roller 13 pressed against the upper surface of the carrier at its line of tangency with roller 12. Roller 13 has a smooth, preferably metallic, surface. As indicated, roller 13 rotates in a clockwise direction so as to oppose the motion of the carrier, but since roller 12 has a rubber surface and roller 13 a smooth, metallic surface, roller 12 grips the carrier and advances it to the right, while the surface of roller 13 is merely wiped across the surface of the carrier.

A roller 14 cooperates with roller 13 and is adjacent but not tangent thereto, nor is it tangent to the carrier. As indicated, roller 14 rotates in a clockwise direction. A trough 15, partly formed by rollers 13 and 14, together with means not shown for damming up the ends of the trough, is provided for holding previously-milled organosol and applying the same to roller 13. An even coating of organosol is thus applied to roller 13 and is smeared by this roller onto the moving carrier 10 which, as stated, has previously been provided with the smooth permanent coating of base material. The organosol may be supplied to trough 15 continuously from any suitable source, such as a mixing vat 16, through a pipe 17.

It is of course to be understood that the coating apparatus may take a wide variety of forms and may incorporate refinements not shown in Fig. 4. For example, coating could be accomplished by means of spreaders, sprayers, hoppers, or other means. As described in pending application Serial No. 458,898, to which reference is again made, means are provided for leaving an uncoated margin along the edges of the carrier to facilitate stripping the film at a later stage in the process.

After receiving the organosol layer, the carrier may be passed across a table 18 heated by a set of steam pipes 19. Alternatively, the carrier could be exposed to a controlled temperature by being passed through an oven or similar apparatus, or it could be subjected to infra-red radiation or high-frequency electromagnetic fields. The effect of this exposure to a controlled temperature will be discussed later, and it will be pointed out that under certain circumstances it is unnecessary to make any special provision for this particular step. The carrier is now passed over reversing roller 20.

A swelling agent or solvent is now applied to the coating. Acetone is a preferred swelling agent because it has a pronounced swelling effect on the resin particles without appreciable dissolving action, which combination of features is found desirable. Methyl ethyl ketone and cyclohexanone are satisfactory. Also, other solvents or mixtures of these various swelling agents are satisfactory. If various conditions, which will be discussed later, are proper, this swelling agent will quickly produce undulations or random designs in relief and intaglio on the upper surface of the organosol layer, and these undulations may be made permanent by drying and fusing the layer in a manner to be described, to form a finished film. The undulated upper surface will have a high gloss. The film will be composed of material which would be transparent if in plane sheet form, but the undulations cause it to be more nearly translucent, and to have the perhaps more important effect of scintillating, as will later be discussed in greater detail. If the condition of the layer prior to the application of the swelling agent is somewhat different, a film will result which is not undulated but is highly smooth, glossy, and transparent. Of course the transparency of either type of film can be reduced by adding to the organosol some opaque material.

As shown in Fig. 4, one means for applying the swelling agent is to pass the inverted, coated carrier under a guide roller 21 and through a bath or trough 22 in which there is provided a quantity of the swelling agent. The swelling agent could alternatively be applied by any other process, such as spraying, which will not physically damage the surface of the organosol film.

After the carrier leaves the trough 22, a blade-like jet of air may be directed against it by an air doctor 23 in order to remove excess swelling agent. The air doctor may be supplied with compressed air from any convenient air line, or from a compressor 23a. The carrier is passed over guide roller 24, and the air doctor may conveniently be located at this point.

The carrier is then passed over a guide roller 25 and through an oven 26 with drying and fusing sections 26a and 26b. Reference may be made to the above pending application Serial No. 503,365 for a description of satisfactory drying apparatus. The purpose of the fusing step is to fuse or unite the resin particles into a continuous film, a technique now well known in the art. When the film has been properly dried, fused and cooled to an appropriate extent, it may be stripped from the surface of the carrier and wound upon a suitable reel 27. This stripping preferably occurs after the coated carrier has passed through suitable tensioning rollers 28. The initial stripping of the film may be accomplished by hand and the film then attached to the reel 27 while the carrier may be attached to a reel 29. These two reels may be operated by any suitable driving mechanism, of well known character, to insure winding of the film and carrier at the same linear speed, the separation being effected as the two components emerge from a pair of rollers 30 which form a part of the tensioning means. For a more detailed explanation of satisfactory tensioning and stripping means, reference is again made to pending application Serial No. 458,898.

While the highly smooth film produced is quite different in appearance from the undulated film, the two are related in that they are produced by the same general steps, the difference being in quantitative variations of the conditions of operation, as will be explained. The two products are also similar in that they both comprise a film with a glossy surface. In the case of the undulated film, this glossy effect, combined with the undulations, produces reflection of incident light from a great many small areas on the film. Furthermore, not only is there considerable reflection at the undulated surface, but since the film produced from vinyl acetate-chloride copolymer has a coefficient of refraction of about 1.5, a considerable portion of any light which strikes the film on the undulated surface and which is refracted at same is totally internally reflected at the smooth, back surface of the film, and emerges again at the undulated surface. As a result, the undulated film produces a marked scintillating effect. When the present process is carried out in the usual manner, the back surface of either type of film is quite smooth, because the film is formed on a smooth carrier. It is also possible to produce a film with undulations on both surfaces by applying a quantity of swelling agent to the carrier before application of the organosol.

The efficacy of the swelling agent for producing either a smooth or an undulated film can be increased by adding to it a vinyl resin, thus rendering it more film-forming. Examples of swelling agents have already been given. The resin added may be the same as that used in preparing the organosol, such as vinyl acetate-chloride copolymer. As an illustration, the resin may constitute 0.5 to 10% by weight of the mixture of swelling agent and resin, or preferably about 2.5%.

If it is desired to produce a colored, undulated film, coloring material may be added, and the scintillation of the film seems to be greater if the coloring material is added to the mixture of resin and swelling agent than if it is added to the original organosol. With the suggested procedure the coloring material is somewhat more concentrated toward the upper, undulated surface, and this seems to enhance scintillation. To produce certain colored effects, however, it may sometimes be desirable to add coloring material to the organosol or to both the organosol and the swelling agent.

The resin added to the swelling agent may be unplasticized. In this case, the undulated or smooth film which results has a surface which is relatively free from tackiness, feeling dry to the touch. This is especially true if a resin is used with a molecular weight which is markedly different from the molecular weight of the organosol. In some applications the tackiness of vinyl resin films is considered objectionable, and hence freedom from this quality may be a considerable advantage.

While satisfactory use of the present invention does not depend upon an understanding of its theory, the following hypothesis is offered as a possible partial explanation of the fact that undulated film is produced under some circumstances, while highly smooth, transparent film is produced under others. The theoretical statements herein made are not to be construed as limiting the scope of the invention.

The resin in an organosol comprising a vinyl resin, dispersant, and diluent will be divided into small particles. Since the molecules are large, there will be perhaps as few as four molecules in the smallest particles.

The dispersant has a great affinity for the resin, and each molecule of resin is surrounded by many smaller molecules of dispersant. Thus some of the dispersant is within the resin particles and some is between them. The diluent in the organosol has a great affinity for the dispersant and is adsorbed by the particles and swells them. This action takes place largely during the milling step.

When a swelling agent is applied to the organosol layer, further swelling of the particles take place. This further swelling seems to be associated with the relative distribution of the dispersant between its location within the particles (on the surface of the molecules) and its location in the interstices between the particles. This swelling also seems to be associated with the quantity of diluent remaining in the organosol. It is believed that one effect of heating the organosol layer is to displace the dispersant within the organosol, that is, to vary its distribution between the locations just mentioned. Another effect of heat seems to be to drive off or remove diluent from the organosol. The extent of these two effects is a function of the temperature to which the organosol layer is subjected, and also of the length of the time during which it is held at a given temperature. At higher temperatures these effects occur very rapidly, whereas they occur more slowly at room temperature. As stated, it has been found desirable that the dispersant used in the organosol have a fairly strong solvating action upon the resin, because apparently the swelling of the particles during the milling operation and also when the swelling agent is applied, is associated with this solvating action. The solvating power seems to be increased at higher temperatures.

The chief factor which determines whether the finished film produced by the present process will be undulated or smooth seems to be the condition of the organosol prior to the application of the swelling agent. It is believed that under some circumstances the condition of the organosol is such that at that time the interstices or voids between the resin particles are great enough in the aggregate so that the expansion of the particles produced by the swelling agent may be taken care of within the film. It may be that the resin particles then merely become distorted in shape so as to fill up the interstices. If the present process is operated under these conditions, a very smooth, transparent film without undulations is produced. The filling up of the interstices probably adds to the transparency by making the film more uniform throughout.

If, however, the condition of the organosol layer prior to application of the swelling agent is such that the expansion of the resin particles produced by this agent cannot be taken care of within the film, undulation is produced. The expansion of the particles causes certain small areas of the layer to be pushed up, and because of surface tension, additional film is drawn up toward these high areas or ridges. This additional film is drawn from low areas, which are thereby made even lower. Thus between two ridges there is produced a deep valley or lake, somewhat similar to a meniscus in a capillary tube. As a result, an undulated surface is produced. When the film has been dried, this surface, both on the ridges and in the valleys, is quite glossy, and has a scintillating or sparkling appearance when light rays fall upon it.

In actual practice the preferred methods of controlling the condition of the organosol in order to obtain the desired undulated or smooth effect are to control the temperature to which the layer is heated prior to application of the swelling agent, or to control the length of time the layer is exposed to any given temperature, which in some cases may be room temperature. If room temperature is used, of course a heating table such as 18 in Fig. 4 would be unnecessary. If the organosol has been properly prepared, either effect can be produced merely by varying the heat, or by varying the time interval of exposure. More heat or a longer time is required for the smooth effect than for the undulated effect.

It is also possible to obtain either a smooth film or an undulated film, again omitting the heating table, by properly proportioning the components in the organosol mixture. In general, in order to obtain a highly smooth film, a higher proportion of resin plus dispersant should be used than is the case for an undulated film, other conditions being equal.

An example will now be given to illustrate the fact that the nature of the finished film can be controlled by varying the time interval between the moment of forming the layer of organosol and the moment of applying the swelling agent. In this example no heating table was used, the layer being exposed to still air at 75° F. and 42% relative humidity. An organosol was prepared comprising:

| | Per cent |
|---|---|
| Vinyl acetate-chloride copolymer (VYNV-1) | 47.3 |
| Dioctyl phthalate | 23.6 |
| Apco | 19.6 |
| Industrial xylol | 9.5 |

A five-mil-thick layer of this organosol was formed and was exposed to the conditions mentioned. It was found that if a swelling agent was applied after three minutes from the moment of forming the layer, an undulated film resulted. If the time interval before application of the swelling agent was four minutes, a highly smooth, transparent film was obtained. Since a certain amount of the Apco was being removed by evaporation while the layer was exposed, measurements were made to determine how much of the original Apco still remained in the organosol after various periods. The results are given below, where the time stated represents the time from the forming of the organosol layer until the measurement was made. The percentages represent a comparison of the Apco remaining in the layer with the Apco originally in the layer.

| | Per cent |
|---|---|
| At moment of forming layer | 100 |
| After 1 minute | 87 |
| After 2 minutes | 75 |
| After 3 minutes | 65 |
| After 4 minutes | 55 |

Thus it appears that the extent of removal of diluent from the organosol is a factor in determining the nature of the finished film. By removing the proper amount, an undulated or a smooth film may be obtained.

As stated above, the condition of the organosol layer prior to application of the swelling agent chiefly determines whether an undulated or a highly smooth, transparent film is obtained. The condition of the organosol layer is controlled by the nature and proportion of the ingredients of the organosol, the conditions under which the organosol is milled, the thickness of the layer of the organosol on the carrier, the temperature and relative humidity to which the layer is exposed, the duration of such exposure, the velocity of any gases passing over the surface of the layer, and other factors. Thus the condition of the layer depends upon so many variable factors that it is difficult to describe all the critical combinations of conditions which define whether an undulated or a highly smooth, transparent film will be obtained.

A test, however, will now be given which can be used to determine whether the condition of the organosol layer is such that upon applying a swelling agent, an undulated film will be produced, or whether a highly smooth, transparent film will be obtained. It is of course to be understood that the desired type of film could be produced without use of this test, merely by holding fixed all the factors except one, such as the temperature to which the layer is exposed prior to application of the solvent, and then determining by observation the temperature which gives the desired undulated or smooth film. A suitable temperature range to which the film may be heated is from 80° to 150° F. It is possible to use higher temperatures for shorter time intervals if the organosol is suitably film-forming so as to avoid cracking. A more practical procedure would perhaps be to use the following test or similar means.

The testing apparatus comprises a pine block in the form of a rectangular parallelepiped with rounded edges, and with faces sandpapered smooth. The dimensions of the block are 1½ x 1 x ⅝ inches and its weight is 6 grams. The weight does not appear to be very critical, since increasing it to 16 grams does not seem to affect the results. If the block is laid on the organosol layer, its 1½ x 1 or its 1½ x ⅝-inch face downward, immediately after application of the layer to the carrier, and then pushed by a force parallel to the surface of the carrier, it will have a tendency to smear the organosol layer, which at the time is very soft. If the layer is first heated somewhat, or is exposed for a while to a given temperature, then when the block is laid on the layer and pushed in the same manner, the layer may be somewhat stronger so that it will not be smeared, but it may still be weak enough so that the block may tear or rupture the film or its surface. If the film is exposed still longer, then the block may be laid on it and pushed along the film, and it will slide without smearing, tearing, or rupturing the film or its surface, as observed by the naked eye. If the swelling agent is applied to the layer during its condition just before it has reached the state at which no rupture occurs, then an undulated film will be produced. On the other hand if the swelling agent is not applied until after the film has passed this condition, that is, if the film is exposed to the given temperature for a longer time or to a higher temperature for the same length of time, then a highly smooth, transparent film is obtained. Similarly if one assumes that the process is being operated under conditions which produce undulated film but which are critically near conditions which would produce a smooth film, then if the process is changed so that the velocity of air moving across the layer of organosol is increased, or if the humidity of this air is decreased, or if the resin content of the film is increased, or if the thickness of the layer is decreased, this change in the process may cause the finished film to be heighly smooth, instead of undulated.

The following specific example is now given wherein the test was applied. The formula for the organosol differed somewhat from the one previously used, and will serve as an additional example of a satisfactory organosol.

The organosol was composed of:

| | Lbs. | Percent by weight |
|---|---|---|
| Vinyl acetate-chloride polymer (VYNV-1) | 1000 | 45.7 |
| Dioctyl phthalate | 500 | 22.9 |
| Apco | 490 | 22.3 |
| Industrial xylol | 200 | 9.1 |

The organosol was ground until a layer cast from it would produce a clear film when fused at 375° F. While this circumstance would be a satisfactory definition of the grinding step, it may be added that it was actually ground in a ball mill of 1000 gallons capacity, the mill being ⅓ filled with steel balls of $\frac{7}{8}$ inch diameter, the organosol being ground approximately 24 hours at 85° F. A layer of the organosol was then formed approximately 10 mils thick.

In still air, and at 75° F. room temperature, with 40 per cent relative humidity, and without any heating step other than exposure at room temperature, the test as described above indicated that after about 10 minutes exposure, there was no tearing of the film by the block. The accuracy of the test was confirmed by applying, after 9½ minutes, a swelling agent. An undulated film was obtained. When the swelling agent was applied after 10½ minutes, a very smooth, transparent film was obtained.

It has been found that the addition to the original organosol of a body which has no affinity for the resin, such as alcohol or tricresyl phosphate, has a tendency to cause a highly smooth effect rather than the undulated effect in the finished film.

There are various factors which control the depth of the relief and intaglio of the undulated film:

The amount of plasticizer used in the organosol is one major factor in this respect. For best results, as stated, the weight of the plasticizer in the organosol should be greater than 15% and preferably greater than 25% of the weight of the resin. On the other hand, when this figure surpasses 75%, the depth of the relief diminishes.

Other factors in controlling the depth of the relief are the time interval during which the film is passing through the swelling agent and the quantity of swelling agent which remains on the film.

Still another major factor in controlling the depth of the relief is the thickness of the organosol layer. If, for example, a layer of organosol is formed, one region of which is thicker than the other, it is possible to obtain relief of different depths in the respective regions. It is also possible to obtain an undulated effect in the thick part and a highly smooth effect in the thin region. This feature serves as a basis for accomplishing one of the objects of the invention, namely, to produce a film, only part of which is undulated, or a film which has a deep relief in one region and a shallow relief in another region.

Figure 5:
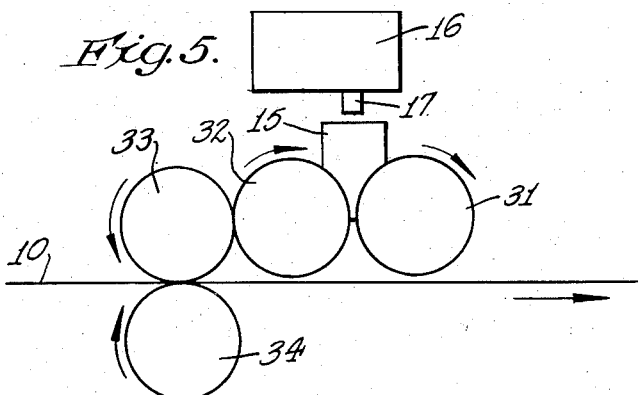
Fig. 5 is an elevation view of an arrangement of coating rollers used in order to produce a film which has undulations in only particular parts of one surface.
Figure 6:
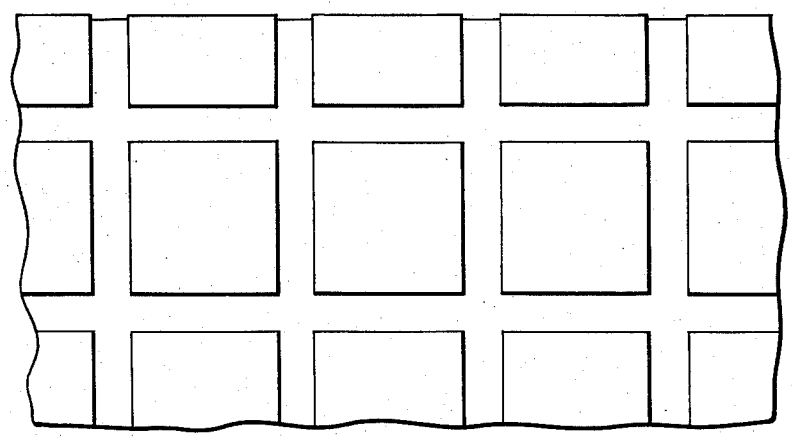
Fig. 6 is an enlarged plan view of a portion of the surface of one of the rollers of Fig. 5.

Fig. 5 is an elevation view of an arrangement of coating rollers which may be used instead of coating rollers 12, 13 and 14 of Fig. 4, in order to form an organosol layer which is thicker in some regions than others. In the arrangement shown in Fig. 5 a smooth, metallic roller 31 cooperates with and is adjacent but not tangent to a similar roller 32, on the left of said roller 31. These two rollers are located above the carrier 10 and are not in contact with it. They each rotate clockwise, as shown in Fig. 5. An even coating of organosol supplied from trough 15 is formed on roller 32. A roller 33, in this illustration, is located on the left of roller 32, and cooperates with same. Roller 33 rotates counterclockwise. This roller 33 may be engraved with a pattern such as is shown in Fig. 6, an enlarged plan view of a portion of said roller. In the embodiment illustrated in Fig. 6, channels are engraved in the surface of the roller. The approximate shape of the cross section of the channels may be observed at the upper edge of the illustration.

Figure 7:
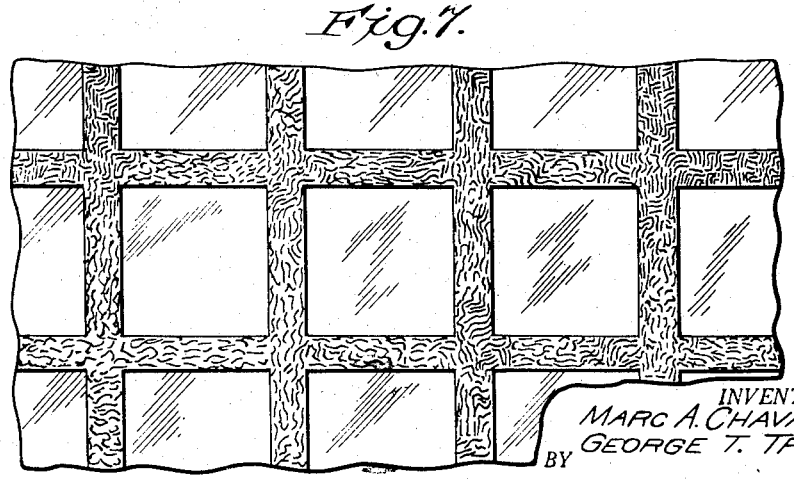
Fig. 7 is an enlarged plan view of a film surface, only part of which is undulated, produced by the apparatus of Figs. 5 and 6.

Rollers 33 and 32 are located adjacent to each other, their surfaces being separated only by a layer of organosol, and as a result of their cooperation, a layer of organosol is applied to the engraved roller 33 by the roller 32. The surface of roller 33 is similarly quite close to the upper surface of the carrier, so that the coating on roller 33 contacts the carrier. A rubber-coated roller 34 is located beneath the carrier and in contact with the same, under roller 33. Roller 34 rotates clockwise and grips the carrier so as to advance same toward the right as shown in Fig. 5. A layer of organosol is applied to the advancing carrier by engraved roller 33, the thickness or depth of this layer varying in accordance with the engraved design on that roller, as desired. This organosol layer may be processed as described previously to obtain a film such as is shown in an enlarged plan view in Fig. 7. It is noticed that the regions where the layer was thick produce an undulated effect, while the regions where the layer was thin produce a highly smooth effect. In this manner, any desired pattern can be produced.

A film with somewhat the same appearance can be produced by first producing a smooth film, and then after this film has been dried and fused, applying organosol to certain regions, the area of these regions representing the desired pattern. Swelling agent can then be applied in the usual manner, and the new layer will become undulated.

It is also possible to produce a similar film on which the undulated region stands up to a considerably greater height. A smooth first film is formed, dried, and fused. To this first film there are then applied with an adhesive, pieces of a second film, or sheets of said second film with cut-out regions. Organosol is then applied to only the built up regions. If swelling agent is then applied to the second film or to the entire exposed surface of the films, an undulated effect can be produced on only the built-up regions, as desired.

Another method of obtaining a film which is undulated only in part or which is undulated in varying degrees in different regions is to apply the swelling agent irregularly to the surface of the organosol layer. Thus the swelling agent may be sprayed on the layer or dropped on it, or allowed to flow onto it in rivulets. In fact, any means may be employed which will cause the swelling agent to reach certain areas to a greater degree than others.

If it is desired to produce a film which has a fluorescent property in combination with an undulated or highly smooth property, a fluorescent substance can be added to the organosol or to the swelling agent. For example, DuPont Rhodamine "B" base can be used in an amount of 0.05% of the swelling agent mixture.

Similarly, if a phosphorescent property is desired a phosphorescent substance can be used in the same manner. For example, calcium sulphide, strontium sulphide, or zinc sulphide can be used.

Another type of ornamental and useful film may be produced by adding to the organosol or to the swelling agent fine metallic flakes. If flakes are added to the swelling agent, their weight may satisfactorily be equal to about 2 to 25% of the weight of the resin which is added to the swelling agent. The film illustrated in Fig. 1 is of this type. Aluminum flakes are satisfactory for this purpose, and they may be tinted gold, bronze, green, blue, or other colors with a dye, before being used.

It is possible, by the teachings of the present invention to produce a porous film. With a favorable swelling agent, such as acetone, for example, the undulated effect may proceed to such an extent that the film is actually perforated at a multiplicity of points.

Various types of scintillating ornamental sheets or webs may be produced by applying an undulated film to a transparent or light-reflecting, flexible or rigid, supporting sheet or web. Such film may also be applied satisfactorily to opaque or non-light-reflecting supporting members, but in this case the scintillation is considerably less. Examples of satisfactory supporting members for a scintillating sheet are transparent or mirrored glass, plastic film, polished metallic sheets, or plastic film charged with aluminum flakes. The metallic sheets may be of nickel, chromium, or other metallic composition. The film may be applied to such members with any adhesive by well known means or may be formed directly thereon. If the film is formed directly on an opaque member and given an undulated effect, there is practically no scintillation.

Another ornamental sheet may be produced comprising a supporting member, such as, for example, a calendered plastic sheet, a sheet of metallic foil applied thereto with adhesive, and a sheet of undulated or smooth plastic film applied to said foil with adhesive or formed directly thereon.

Still another type of sheet may be obtained by using a calendered plastic sheet as a supporting member, coating aluminum flakes thereon, forming a layer of organosol thereon, and then producing an undulated effect on this last-mentioned layer by the means previously described. In order to apply the flakes to the plastic sheet, they may be first mixed dry with a resin such as vinyl acetate-chloride copolymer. The weight of the flakes may be, for example, from 1/20 to 1/2 the weight of the resin. The dry mixture may then be mixed with a solvent for the resin, such as cyclohexanone or methyl ethyl ketone. The proportion of solvent to dry mixture is not very critical. It may, for example, be four times the weight of the dry mixture in the case of cyclohexanone or eight times the weight in case methyl ethyl ketone is used.

The substance comprising the flakes, resin, and solvent is applied to the calendered sheet, dried, and fused. The undulated film is then formed directly on the surface of aluminum flakes.

While a suitable form of apparatus and mode of procedure, to be used in accordance with the invention, and various improved products resulting therefrom have been described in some detail, and certain modifications have been suggested, it will be understood that numerous changes may be made without departing from the general principles and scope of the invention.

We claim:

1. A method of forming a glossy, self-sustaining, resinous film, comprising the steps of forming on a flexible carrier a layer of an organosol comprising polymerized vinyl chloride, a plasticizer, and a diluent, drying said layer only partially, applying to said layer while it is on said carrier and before it has dried sufficiently to be self-sustaining a solvent for said polymerized vinyl chloride, substantially completely drying said layer and fusing it to convert it into a self-sustaining film, and thereafter stripping said film from said carrier.

2. A method of forming a glossy, self-sustaining, resinous film, comprising the steps of forming on a carrier a layer of an organosol comprising a copolymer of vinyl acetate and vinyl chloride, a plasticizer, and a diluent, drying said layer only partially, applying a solvent for said copolymer to at least part of the exposed surface of said layer while said layer is still on said carrier and before it has dried sufficiently to be self-sustaining, substantially completely drying said layer and fusing same, to convert it into a self-sustaining film, and thereafter stripping said film from said carrier.

3. A method of forming a smooth, glossy, transparent, self-sustaining, resinous film, including the steps of forming a layer of an organosol comprising a vinyl ester resin, a plasticizer and a diluent, applying a swelling agent to said layer, and drying said layer.

4. A method of forming a self-sustaining, resinous film, at least part of one surface of which is undulated and glossy, comprising the steps of forming on a carrier a layer of an organosol comprising a copolymer of vinyl acetate and vinyl chloride, a plasticizer, and a diluent, removing a portion of said diluent from said layer, applying a swelling agent to said layer, drying and fusing said layer, and stripping said layer from said carrier.

5. A method of forming a smooth, glossy, self-sustaining resinous film, including the steps of applying an organosol as a layer upon the surface of a carrier, said organosol comprising a copolymer of vinyl acetate and vinyl chloride, a plasticizer and a diluent, removing from said layer such a portion of the diluent that said layer will become smooth and glossy upon application thereto of a swelling agent, applying a swelling agent to said layer while said layer is still on said carrier, said swelling agent comprising a solvent for said copolymer, further drying said layer, fusing said layer, and stripping said layer from said carrier.

6. A method of forming a highly smooth, glossy, transparent, self-sustaining resinous film, including the steps of applying an organosol as a layer upon the surface of a carrier, said organosol comprising a copolymer of vinyl acetate and vinyl chloride, a plasticizer, and a diluent, applying a swelling agent to said layer, drying, fusing and stripping said layer from said carrier.

7. A method of forming a highly smooth, glossy, self-sustaining resinous film comprising the steps of applying an organosol as a layer upon the surface of a carrier, said organosol comprising a vinyl ester resin, a plasticizer, and a diluent, exposing said layer to controlled temperature, applying a swelling agent to said layer while it is on said carrier, said swelling agent comprising a solvent for said resin, drying and fusing said layer, and stripping said layer from said carrier.

8. A method of forming a highly smooth, glossy, self-sustaining resinous film comprising the steps of applying organosol as a layer upon the surface of a carrier, said organosol comprising a vinyl ester resin, a plasticizer, and a diluent, applying a swelling agent to said layer, said swelling agent comprising a solvent for said resin and a resin dissolved therein.

9. A method of forming a self-sustaining, resinous film having one smooth surface and one undulated surface, comprising the steps of forming on a continuously advancing, flexible carrier, a continuous layer of an organosol comprising, a vinyl resin, a plasticizer, and a diluent, drying said layer only partially to remove a portion of said diluent, applying to at least part of the exposed surface of said layer while said layer is on said carrier and before it has dried sufficiently to be self-sustaining a solvent for said resin, to produce surface undulations in said layer, thereafter completing the drying of said layer, and fusing said layer, to convert it into a self-sustaining film, and subsequently stripping said film from said carrier.

10. A method of forming a self-sustaining, resinous film having one smooth surface and one surface undulated at least in part, comprising the steps of forming on a continuously advancing carrier a continuous layer of an organosol comprising a copolymer of vinyl acetate and vinyl chloride, a plasticizer, and a diluent, drying said layer only partially, applying to said layer before it has dried sufficiently to be self-sustaining a solvent for said copolymer of vinyl acetate and vinyl chloride, to undulate the exposed surface of said layer, thereafter substantially completely drying said layer and fusing same, to convert it into a self-sustaining film, and subsequently stripping said film from said carrier.

11. A method of forming a self-sustaining resinous film having one smooth surface and one surface parts of which are undulated and parts of which are smooth, comprising the steps specified in claim 10, in which said solvent is applied to only part of said layer.

12. A method of producing an undulated, self-sustaining resinous film, comprising the steps of forming on a continuously advancing carrier a layer of an organosol comprising a copolymer of vinyl acetate and vinyl chloride, a plasticizer, and a diluent, partially drying said layer so as to remove a portion of said diluent, applying acetone to the surface of said layer opposite said carrier to produce undulations in said surface, thereafter substantially completely drying and fusing said layer to form a self-sustaining film, and then stripping said film from said carrier.

13. A method of forming a self-sustaining resinous film having one smooth surface and one undulated surface, said method comprising the steps of forming on a continuously advancing carrier a continuous layer of an organosol comprising a resin, a plasticizer, and a diluent, said resin comprising a polymer of vinyl chloride, drying said layer only partially, applying to said layer before it has dried sufficiently to be self-sustaining a swelling agent comprising a solvent for said first-mentioned resin, to undulate the exposed surface of said layer, thereafter substantially completely drying said layer and fusing same, to convert it into a self-sustaining film, and subsequently stripping said film from said carrier.

14. A method as in claim 13 in which said swelling agent comprises a solvent for said first-mentioned resin, a resin dissolved therein, and coloring material.

15. A method of producing an undulated, self-sustaining, resinous film, comprising the steps of forming on a carrier a layer of an organosol comprising a vinyl ester resin, a plasticizer, and a diluent, partially drying said layer, applying to said layer while it is on said carrier and before it has dried sufficiently to be self-sustaining a solvent for said resin, to undulate the exposed surface of said layer, thereafter substantially completely drying said layer and fusing same, to convert it into a self-sustaining film, and subsequently stripping said film from said carrier.

16. A method as in claim 15, in which said resin comprises polymerized vinyl chloride.

17. A method of forming a self-sustaining, resinous film, at least part of one surface of which is undulated, comprising the steps of forming a layer of an organosol upon the surface of a carrier, said organosol comprising a plasticizer, a diluent, and a vinyl resin comprising polymerized vinyl chloride, the ratio by weight of said plasticizer to said resin being greater than 0.15 to 1 and less than 1.10 to 1, drying said layer only partially, applying a swelling agent to said layer while said layer is adhering to said carrier and before it has dried sufficiently to be self-sustaining, drying and fusing said layer, and stripping said layer from said carrier.

18. A method of forming a self-sustaining, resinous film, at least part of one surface of which is undulated, comprising the steps of forming a layer of an organosol upon the surface of a carrier, said organosol comprising a copolymer of vinyl acetate and vinyl chloride, a plasticizer, and a diluent, applying a swelling agent to at least part of the exposed area of said layer while said layer is on said carrier, to produce surface undulations, said swelling agent comprising a solvent for said copolymer containing a resin dissolved therein, said resin comprising at least 0.5% and not more than 10% by weight of the solution of said resin in said solvent, drying and fusing said layer, and stripping said layer from said carrier.

19. A method of forming a porous, undulated, self-sustaining resinous film, including the steps of applying to the surface of a carrier a layer of an organosol, said organosol comprising a vinyl resin, a plasticizer, and a diluent, drying said layer only partially, applying to said layer while said layer is on said carrier a solvent for said resin, allowing said solvent to act upon said organosol until said layer is undulated and is perforated at a multiplicity of points, drying said layer, fusing said layer, and stripping said layer from said carrier.

20. A method of forming a self-sustaining resinous film, only part of one surface of which is undulated, including the steps of applying an organosol as a layer of non-uniform thickness upon the suface of a carrier, said organosol comprising a vinyl resin, a plasticizer, and a diluent, only partially drying all areas of said layer, applying to at least part of the exposed surface of said layer while said layer is on said carrier and before it has dried sufficiently to be self-sustaining a solvent for said resin, to undulate only certain areas of the exposed surface of said layer, thereafter substantially completely drying said layer and fusing same, to convert it into a self-sustaining film, and subsequently stripping said film from said carrier.

21. A method of forming a fluorescent, self-sustaining resinous film, at least part of one surface of which is undulated, including the steps of providing a layer of an organosol upon the surface of a carrier, said organosol comprising a vinyl ester resin, a plasticizer, and a diluent, applying a swelling agent to said layer, said swelling agent comprising a solvent for said resin, a resin dissolved therein, and a fluorescent material, and drying said layer.

22. A method of forming a self-sustaining, resinous film, at least part of one surface of which is undulated, including the steps of providing a layer of an organosol upon the surface of a carrier, said organosol comprising a copolymer of vinyl acetate and vinyl chloride, a plasticizer, and a diluent, applying a swelling agent to said layer, said swelling agent comprising solvent and a film-forming substance, at least one of said film-forming substances including a substance which is capable of emitting light in the absence of incident visible light.

23. A method of forming a fluorescent, self-sustaining resinous film, at least part of one surface of which is undulated, including the steps of providing a layer of an organosol upon the surface of a carrier, said organosol comprising a copolymer of vinyl acetate and vinyl chloride, a plasticizer, a diluent, and a fluorescent material, applying a swelling agent to said layer, and drying said layer.

24. A method of forming a phosphorescent, self-sustaining, resinous film, at least part of one surface of which is undulated, including the steps of providing a layer of an organosol upon the surface of a carrier, said organosol comprising a copolymer of vinyl acetate and vinyl chloride, a plasticizer, a diluent, and a phosphorescent material, applying a swelling agent to said layer, and drying said layer.

25. A method of forming a self-sustaining resinous film having one smooth side and one irregular side, said irregular side having depressed regions in which the surface is smooth and glossy and elevated regions in which the surface is randomly undulated and glossy, said method comprising the steps of forming on a smooth, continuously-advancing carrier a layer of varying thickness of an organosol comprising a polymer of vinyl chloride, the exposed side of said layer having smooth depressed regions and smooth elevated regions, subjecting said layer to a partial drying step for a controlled time interval, applying a solvent to said layer, said time interval being sufficiently long that upon application of said solvent said depressed regions become glossy and smooth and said elevated regions become glossy and undulated, drying said layer substantially completely and fusing same to form a self-sustaining film, and thereafter stripping said layer from said carrier.

26. A method of forming an ornamental self-sustaining plastic sheet at least part of one surface of which is undulated, comprising the steps of providing a resinous sheet, applying to part of one surface thereof a layer of an organosol comprising a vinyl ester resin, a plasticizer, and a diluent, applying a swelling agent to said layer, drying and fusing said layer.

27. A method of forming an ornamental, self-sustaining resinous sheet, part of one surface of which is undulated, including the steps of providing a first resinous film, applying to said first film and adhesively bonding thereto at least one layer of a second resinous film, applying to said second film a coating of an organosol comprising a copolymer of vinyl acetate and vinyl chloride, a plasticizer, and a diluent, applying a swelling agent to said coating, drying and fusing said coating.

28. A method of forming an ornamental, sheet-like article comprising a supporting sheet, metallic foil, and an undulated plastic sheet, comprising the steps of applying said foil to said supporting sheet with adhesive, forming a layer of organosol on said foil, said organosol comprising a vinyl ester resin, a plasticizer, and a diluent, applying to said layer a swelling agent, and drying said layer.

29. A method of forming a scintillating ornamental sheet comprising a light-reflecting supporting member and an undulated resinous film, said method comprising forming on said light-reflecting supporting member a layer of an organosol comprising a vinyl ester resin, a plasticizer, and a diluent, applying to said layer a swelling agent, drying and fusing said layer.

30. A method of forming a scintillating, ornamental sheet comprising the steps of providing a supporting resinous sheet, applying to said resinous sheet with adhesive a coating comprising metallic flakes, forming on said coating a layer of an organosol comprising a vinyl ester resin, a plasticizer, and a diluent, applying a swelling agent to said layer, and drying said layer.

31. A method of forming a scintillating, self-sustaining ornamental sheet comprising the steps of providing a transparent supporting sheet, forming thereon a layer of an organosol comprising a vinyl ester resin, a plasticizer, and a diluent, applying a swelling agent to said layer, and drying said layer.

32. A method of forming a scintillating, ornamental sheet comprising the steps of providing a metallic supporting sheet, forming thereon a layer of an organosol comprising a vinyl ester resin, a plasticizer, and a diluent, applying a swelling agent to said layer, and drying said layer.

33. A method of forming a scintillating, ornamental sheet comprising the steps of providing a glass supporting sheet, forming thereon a layer of an organosol comprising a vinyl ester resin, a plasticizer, and a diluent, applying a swelling agent to said layer and drying said layer.

34. A method of forming a scintillating, self-sustaining, ornamental sheet comprising the steps of applying to a carrier a layer of an organosol comprising a copolymer of vinyl acetate and vinyl chloride, a plasticizer, a diluent, and metallic flakes, applying a swelling agent to said layer, and drying said layer.

35. A method of forming a scintillating, self-sustaining, ornamental sheet comprising the steps of applying to a carrier a layer of an organosol comprising a vinyl ester resin, a plasticizer, and a diluent, applying to said layer a swelling agent comprising a solvent for said resin, resin dissolved therein and metallic flakes, and drying said layer.

MARC A. CHAVANNES.
GEORGE T. TRAUT.

(References on following page)

References Cited

The following references are of record in the file of this patent:

UNITED STATES PATENTS

| Number | Name | Date |
|---|---|---|
| 1,582,605 | Hoskins | Apr. 27, 1926 |
| 2,036,377 | Wells | Apr. 7, 1936 |
| 2,142,968 | Stoesser | Jan. 3, 1939 |
| 2,209,940 | Smith | July 30, 1940 |
| 2,273,700 | Feuerstein | Feb. 17, 1942 |
| 2,281,445 | Kauppi | Apr. 28, 1942 |
| 2,293,174 | Rooney et al. | Aug. 18, 1942 |
| 2,304,632 | Faelten | Dec. 8, 1942 |
| 2,351,208 | Herrmann et al. | June 13, 1944 |
| 2,353,504 | Schachar | July 11, 1944 |
| 2,360,650 | Crane | Oct. 17, 1944 |
| 2,364,001 | Schieman | Nov. 28, 1944 |
| 2,371,001 | Stone | Mar. 6, 1945 |
| 2,472,551 | Smith | June 7, 1949 |

FOREIGN PATENTS

| Number | Country | Date |
|---|---|---|
| 500,298 | Great Britain | Feb. 7, 1939 |

OTHER REFERENCES

Jordan, Technology of Solvents, Leonard Hill Ltd., London 1940. (Copy in Division 15, pages 43–45.)

Ser. No. 399,750, Herrmann et al. (A. P. C.), published Apr. 27, 1943.